US008868020B2

(12) United States Patent
Vishwanathan et al.

(10) Patent No.: US 8,868,020 B2
(45) Date of Patent: Oct. 21, 2014

(54) COMMUNITY INTERACTION USING MOBILE COMMUNICATION DEVICES

(75) Inventors: Kumar K. Vishwanathan, Windham, NH (US); Prakash R. Iyer, North Andover, MA (US); Rangamani Sundar, Windham, NH (US); Kumar Raman, Haverhill, MA (US); Girish Hariharasubramani, Chennai (IN)

(73) Assignee: Wechat International Pte. Ltd., Singagpore (SG)

( * ) Notice: Subject to any disclaimer, the term of this patent is extended or adjusted under 35 U.S.C. 154(b) by 199 days.

(21) Appl. No.: 13/420,011

(22) Filed: Mar. 14, 2012

(65) Prior Publication Data

US 2012/0172005 A1    Jul. 5, 2012

Related U.S. Application Data

(62) Division of application No. 11/970,709, filed on Jan. 8, 2008, now Pat. No. 8,160,532.

(60) Provisional application No. 60/883,910, filed on Jan. 8, 2007, provisional application No. 60/950,890, filed on Jul. 20, 2007.

(51) Int. Cl.
*H04B 1/10* (2006.01)
*H04M 3/42* (2006.01)

(52) U.S. Cl.
CPC .... *H04M 3/42374* (2013.01); *H04M 2203/554* (2013.01); *H04M 2207/18* (2013.01); *H04M 2203/2044* (2013.01); *H04M 2203/655* (2013.01)
USPC ..................... 455/310; 455/414.1; 455/414.2; 455/414.3; 455/413; 455/466

(58) Field of Classification Search
CPC ................................................ H04M 2203/554
USPC ........ 455/310, 414.1, 414.2, 414.3, 413, 466; 709/224
See application file for complete search history.

(56) References Cited

U.S. PATENT DOCUMENTS 6,052,122 A    4/2000  Sutcliffe et al.
6,807,529 B2  10/2004  Johnson et al.
(Continued)

OTHER PUBLICATIONS

International Search Report and Written Opinion in International Application No. PCT/US08/50474, dated May 16, 2008.

(Continued)

*Primary Examiner* — Sanh Phu
(74) *Attorney, Agent, or Firm* — Anova Law Group, PLLC

(57) ABSTRACT

Techniques are provided for delivering content to mobile communication devices related to interactions of members with a user community. The method involves detecting a communication session involving a mobile communication device; determining one or more context parameters associated with the communication session; and delivering content related to the context parameters to one or more mobile communication devices. Data is stored at a central computing entity that indicates association or membership of a plurality of mobile communication device users in a user community. The central computing entity detects when an action is taken by one mobile device user that is a member of the user community, and sends a notification to members of the social circle based on the detected action. These techniques allow individuals who are involved in a user community to maintain their interaction with the user community using their mobile communication devices.

19 Claims, 10 Drawing Sheets

(56) References Cited

U.S. PATENT DOCUMENTS

| | | |
|---|---|---|
| 6,912,581 B2 | 6/2005 | Johnson et al. |
| 6,996,394 B2 | 2/2006 | Minear et al. |
| 7,251,495 B2 | 7/2007 | Keyani et al. |
| 7,280,822 B2 | 10/2007 | Fraccaroli |
| 7,733,232 B2 | 6/2010 | Light et al. |
| 8,160,532 B2 | 4/2012 | Vishwanathan et al. |
| 2001/0041561 A1 | 11/2001 | Ventulett et al. |
| 2006/0190616 A1* | 8/2006 | Mayerhofer et al. ......... 709/231 |
| 2006/0218234 A1 | 9/2006 | Deng et al. |
| 2006/0242291 A1 | 10/2006 | Nevalainen |
| 2006/0258397 A1 | 11/2006 | Kaplan et al. |
| 2006/0271953 A1* | 11/2006 | Jacoby et al. .................. 725/34 |
| 2010/0137010 A1 | 6/2010 | Counts et al. |

OTHER PUBLICATIONS

U.S. Appl. No. 60/883,910, filed Jan. 8, 2007 Inventors: Kumar K. Vishwanathan, Prakash R. Iyer, Rangamani Sundar, Kumar Raman Title: System and Method for Social Community Interaction Using Mobile Communication Devices.

U.S. Appl. No. 60/950,890, filed Jul. 20, 2007 Inventors: Kumar K. Vishwanathan, Prakash R. Iyer, Rangamani Sundar Title: System and Method for Social Community Interaction Using Mobile Communication Devices.

* cited by examiner

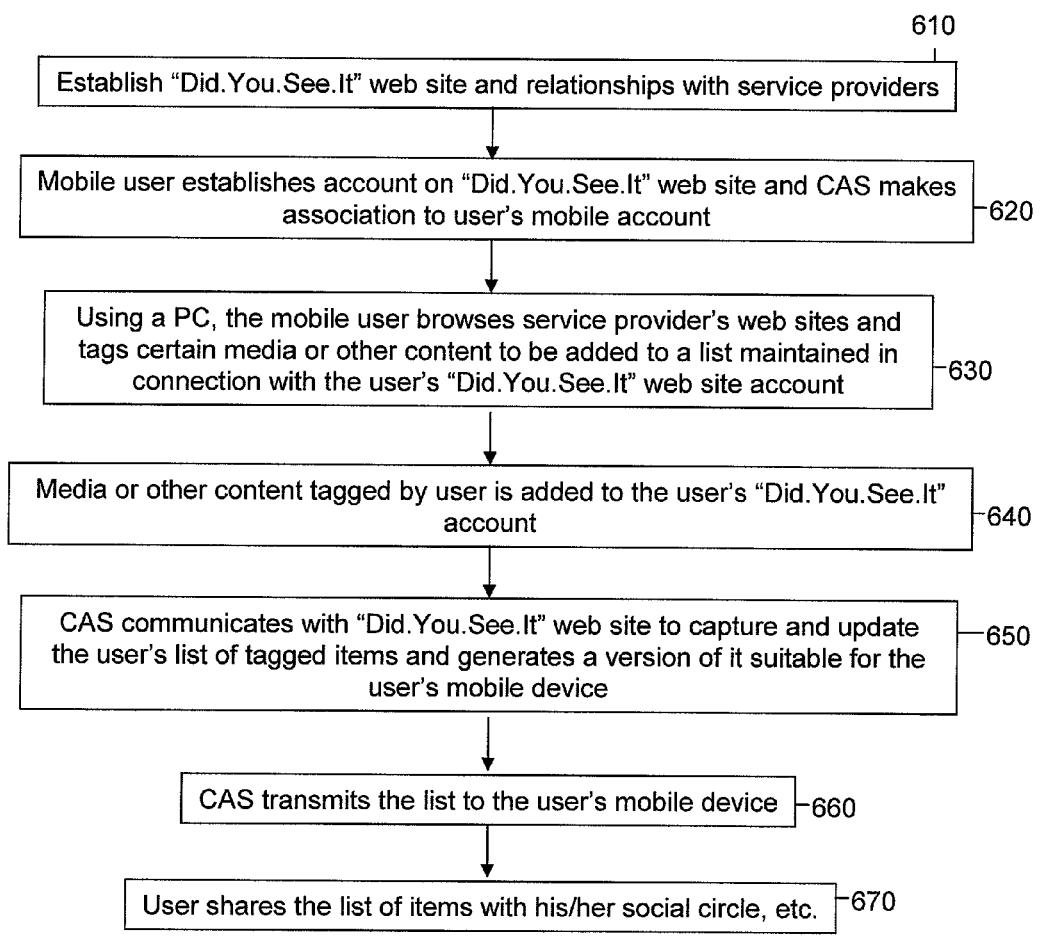

US 8,868,020 B2

COMMUNITY INTERACTION USING MOBILE COMMUNICATION DEVICES

RELATED APPLICATIONS

This application is a divisional of U.S. Non-Provisional application Ser. No. 11/970,709, filed Jan. 8, 2008 which claims priority to U.S. Provisional Application No. 60/883,910, filed Jan. 8, 2007 and to U.S. Provisional Application No. 60/950,890, filed Jul. 20, 2007. The entirety of each of these applications is incorporated herein by reference.

FIELD OF THE INVENTION

The present invention is directed to mobile communication devices and services, and more particularly to delivery content and information to mobile communication device users who are members of user communities.

BACKGROUND OF THE INVENTION

Mobile communication devices, e.g. cellular phones, are becoming more data centric and less voice centric and the modern mobile lifestyle is changing rapidly. Indeed, in many countries, the mobile phone is the "primary screen" in the household instead of a laptop or desktop computer.

Social communities have become ways for individuals to keep up with the latest trends in music, fashion, media, etc. Many web sites have been created to help people share information with others that have similar interests. It is desirable to leverage this interest in sharing information in order to target the marketing products and services.

SUMMARY OF THE INVENTION

Briefly, techniques are provided for delivering content to mobile communication device users and also for coordinating actions of mobile communication device users that are members of a user community, also called a social community or social circle. In one embodiment, a method is provided that involves detecting a communication session involving a mobile communication device user; determining one or more context parameters associated with the communication session; and delivering content related to the context parameters to one or more mobile communication devices.

In another embodiment, a method is provided for coordinating actions of mobile communication device users that are members in a user community. Data is stored at a central computing entity (that may comprise a single computing device or a group of distributed computers, such as server computers) that indicates association or membership of a plurality of mobile communication device users in a user community. The central computing entity detects when an action is taken by one mobile device user that is a member of the user community, which action is related to the user community. The central computing device sends a notification to members of the user community based on the detected action. Users may also share, via their mobile devices, information related to items of interest discovered while browsing, from a personal computer, web sites of various service providers.

According to another embodiment, a method is providing for sharing information among a plurality of mobile communication device users. The method comprises storing data associated with a user's selection of an item of interest while the user views information at a web site of a vendor of goods or services, wherein said storing comprises storing the data in association with an identifier for said user; and sending a notification to mobile communication device users that are members of a user community to which said user is a member, wherein said notification contains information concerning the item of interest selected by the user.

BRIEF DESCRIPTION OF THE DRAWINGS

FIGS. 9 and 10 are flow charts illustrating examples of functions for coordinating actions of users with service providers and user communities depicted in FIG. 8.

DETAILED DESCRIPTION

Figure 1:
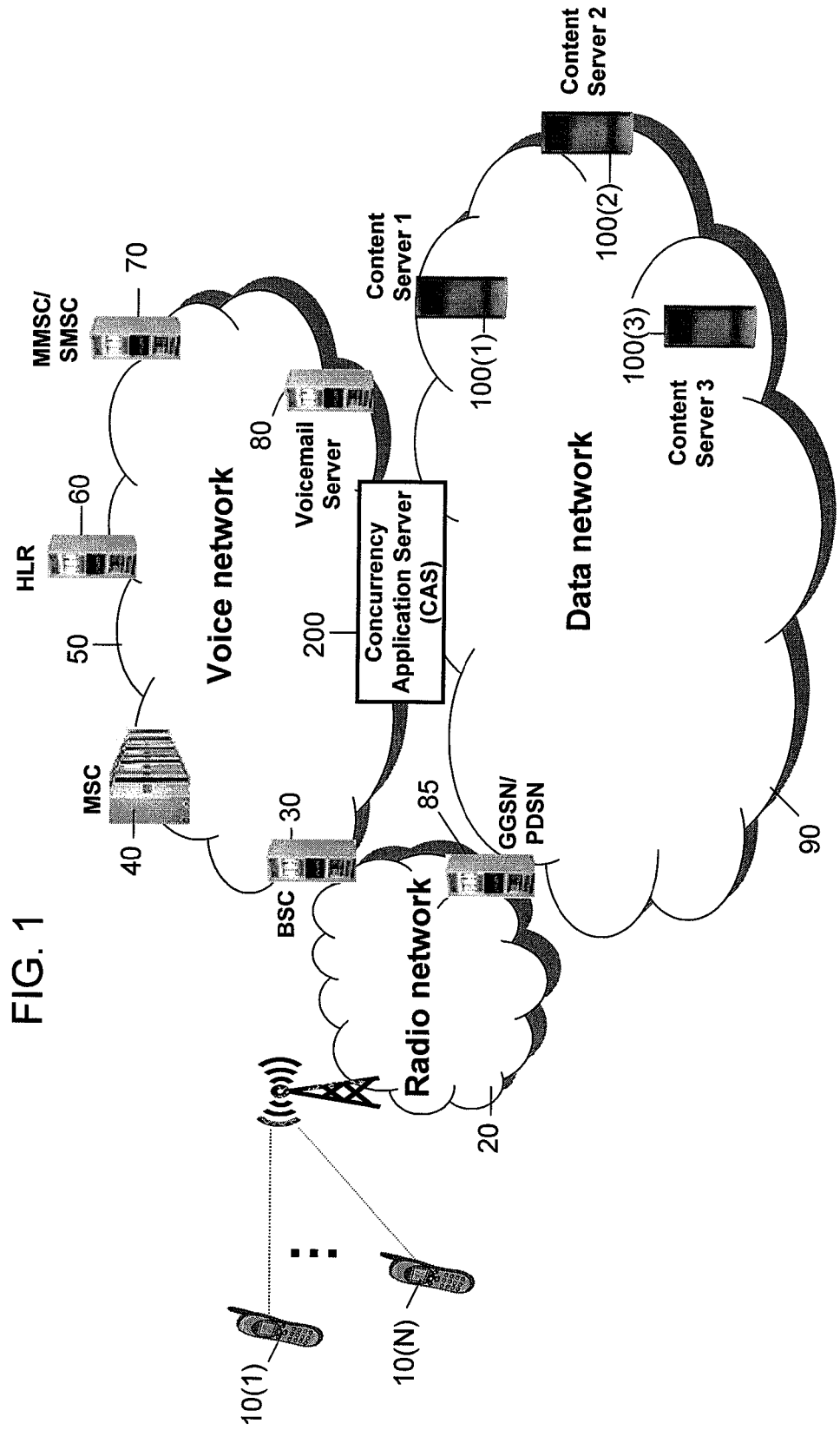
FIG. 1 is a high level block diagram showing a mobile communication system that is enhanced according to the techniques of the invention described herein to deliver concurrent applications to mobile communication devices.
Figure 2:
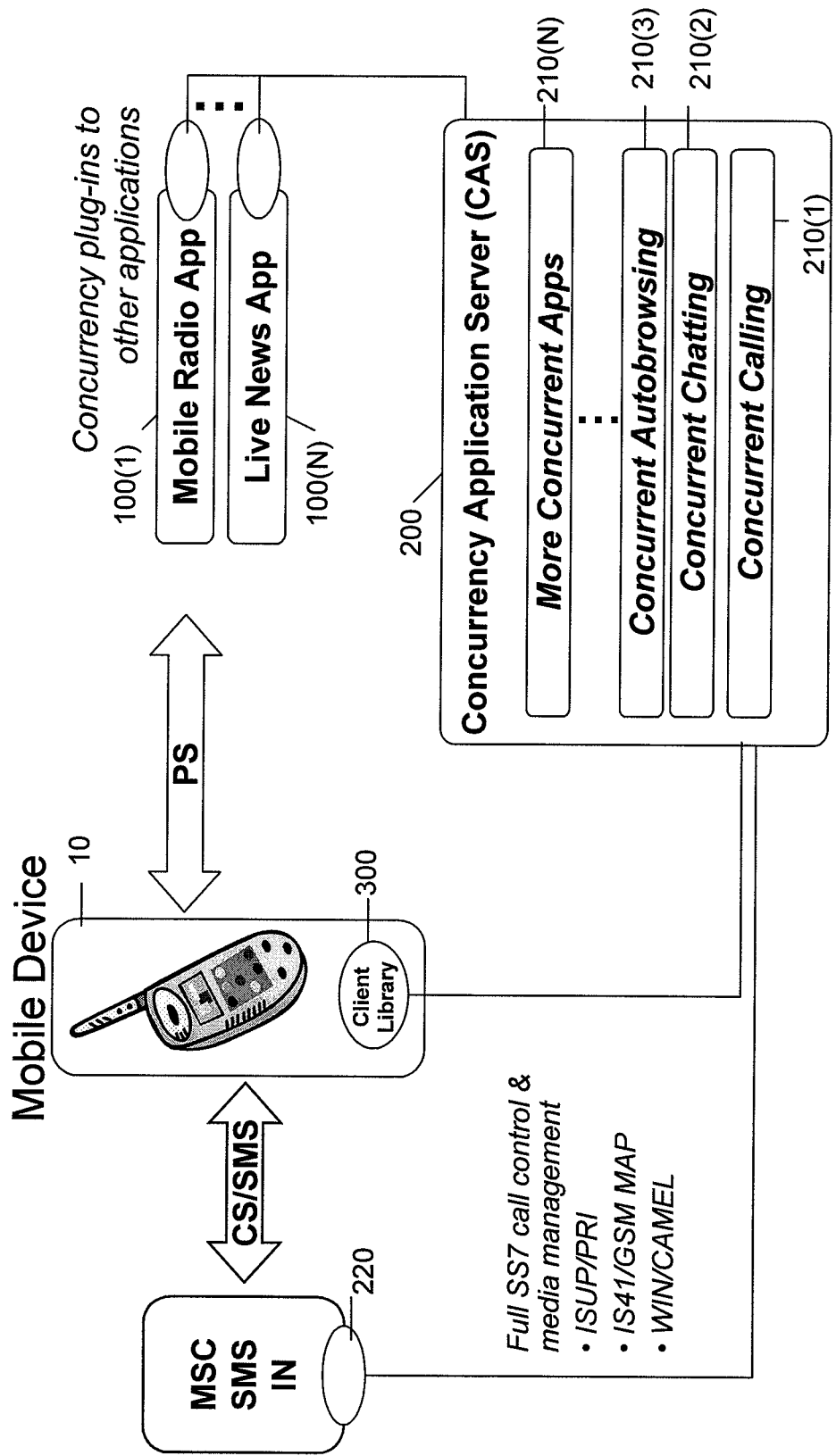
FIG. 2 is a high level data flow diagram showing a concurrency application server that communications with a library component in a mobile device according to the present invention.

Referring first to FIGS. 1 and 2, the system and method for delivering digital content to mobile devices will be described. The mobile communication devices are shown at reference numeral 10(1) to 10(N) and may be cellular phone or other wireless communication devices that have sufficient display and user interface capability beyond simple telephony functions. Such devices are currently available and they have capabilities including mobile web browsing, mobile instant messaging and related capabilities.

As is known in the art, mobile communication devices 10(1)-10(N) achieve a wireless radio communication link via a radio network 20 to base station control centers (BSCs) 30 and the BSCs 30 are in turn connected to a mobile switching center (MSC) 40 that is part of a voice network 50. Also in the voice network 50 is a home location register (HLR) 60 and a multimedia messaging service center/short message service center (MMSC/SMSC) 70 and a voicemail server 80. The MMSC/SMSC 70 handles processing of data messages to/from a mobile communication device. The radio network 20 is also connected to a data or packet network 90 by a GSM gateway serving node (GGSN)/packet data serving node (PDSN)/wireless internet access router 85. Alternatively, multimodal mobile handsets may connect to the IP network via any other available radio technology like WiFi (IEEE 802.11), WiMax (IEEE 802.16) etc. The data network 90 may include content servers 100(1), 100(2) and 100(3) that are accessible via the WWW for digital content.

A mobile content system is provided that comprises a concurrency application server (CAS) 200 and a small client library 300 also called a concurrency application plug-in that resides in the mobile devices 10(1) to 10(N). The CAS 200 interfaces with equipment in the voice network 50 and equipment in the data network 90, e.g., the Internet. A mobile device 10(i) equipped with the concurrency application plug-in is said to be a concurrency-enabled mobile device. Thus, any currently available or hereinafter developed mobile device having the aforementioned user interface capabilities may be made concurrency-enabled by installing the client library 300 or otherwise configured with the functionality of the client library 300 as described herein. For example, the client library functionality may made part of the operating system of a mobile device. The functions of the CAS 200 may be performed by a (central) computing entity that is a single computing device or a group of distributed server computers.

The CAS 200 comprises an interface function (described hereinafter) that detects incoming calls or communication sessions that may be originate from an MSC or MMSC/SMSC. Depending on which concurrent applications the mobile device user has subscribed, the CAS 200 activates a mobile application. The CAS 200 comprises a plurality of mobile applications 210(1) to 210(N) that can be running concurrently in cooperation with a client library 300 on any number of mobile devices 10. Examples of mobile applications include a voice calling application 210(1), voice mail application 210(2), chatting application 210(3) and auto-browsing application 210(4). Additional mobile applications are described hereinafter. The mobile applications 210(1) to 210(N) may interface with third party applications 110(1) to 110(N) which may include, for example, a mobile radio application 110(1) and a live news application 110(N), as well as a mobile gaming application 120(1). The CAS 200 comprises concurrent application plug-ins 215(1) to 215(M) to enable interaction between the CAS applications and the third party applications.

A concurrent mobile application may be initiated by the CAS 200 as explained above or by the mobile device as well. For example, the client library 300 on the mobile device may activate a mobile application based on an incoming call or certain incoming message notifications. Thus, the mobile device or the CAS 200 may detect the need for concurrency and activate a mobile application concurrent with an already activated mobile application.

The functions of the CAS 200, such as the content delivery functions described herein, may be embodied by one or more computer program instructions that, when executed by computer processor, cause the computer processor to perform the functions that are described herein.

Figure 3:
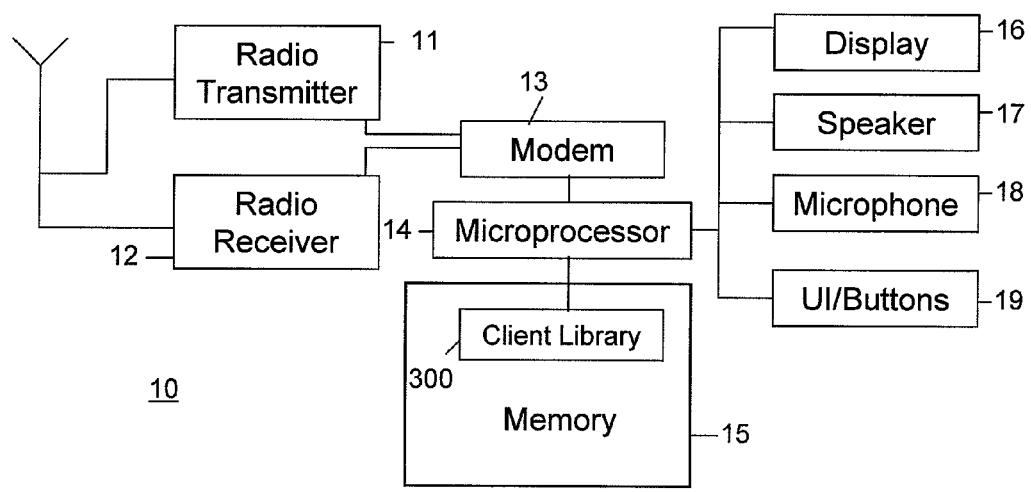
FIG. 3 is a block diagram of a mobile communication useful in accordance with the embodiments of the present invention.

FIG. 3 illustrates a block diagram of a mobile device 10 according to one embodiment. The mobile device 10 comprises a radio transmitter 11, a radio receiver 12, a modem (baseband signal processor) 13, microprocessor 14, memory 15 and a variety of user interface components such as a display 16, speaker 17, microphone 18 and user interface buttons 19. The functions of many of the components are well known in the art and are therefore not described in detail herein. The client library 300 is installed in the memory 15. In addition to the client library 300, the memory 15 stores other software programs that are executed by the microprocessor 14 to provide the various mobile device functions to the user and coordinate cooperation with the CAS 200. The mobile device 10 need have only one instance each of a radio transmitter 11 and a radio receiver 12 to provide for multiple concurrent mobile applications to the device user. No modification to the hardware of a mobile device is necessary to achieve the concurrent mobile application functionality described herein. Moreover, no modification of the over-the-air communication protocol (between a mobile device and the radio network 20) is necessary to provide the concurrent application functionality described herein.

Figure 4:
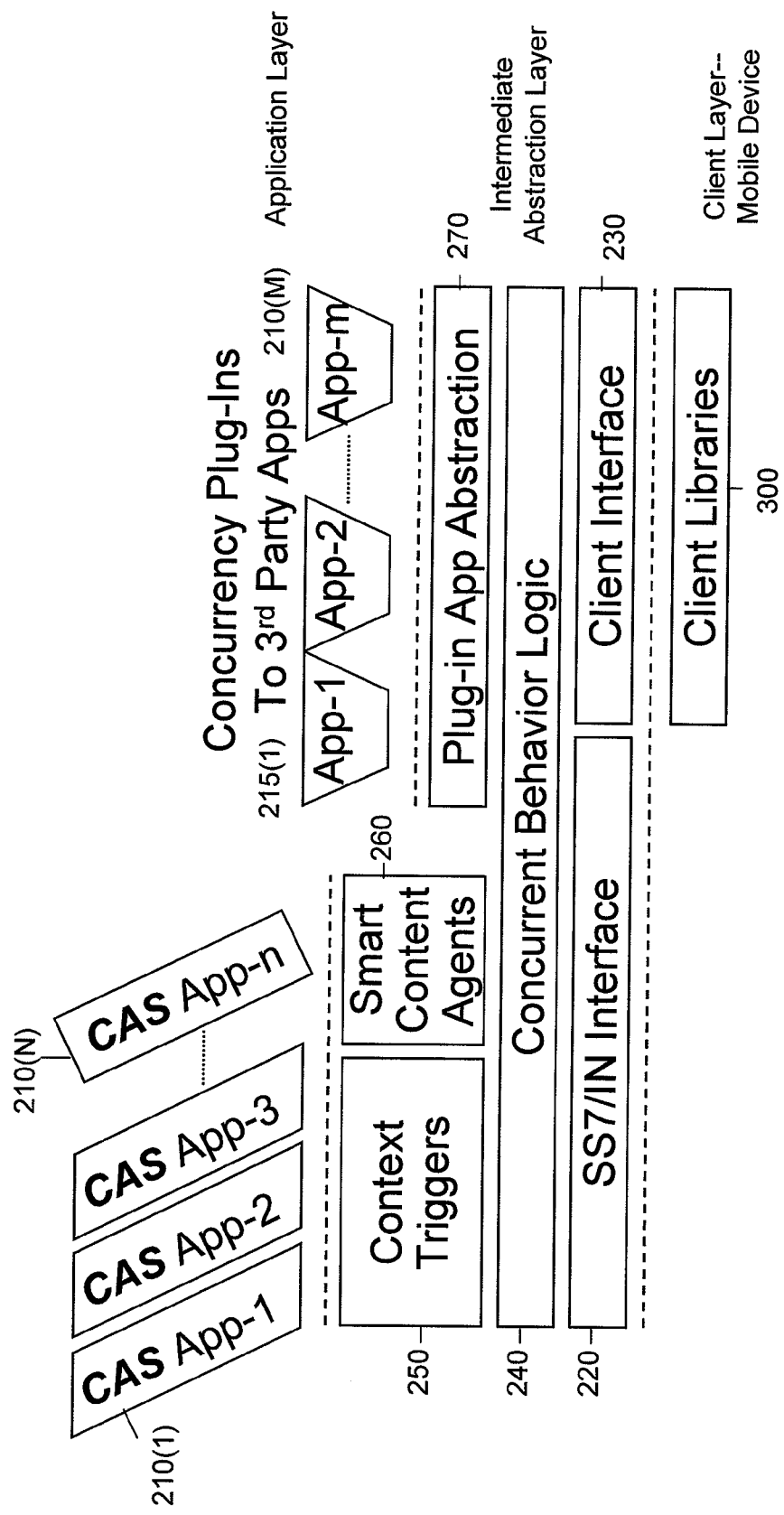
FIG. 4 is a block diagram of the software architecture of the concurrency application system according to the present invention.

FIG. 4 illustrates an example of a software architecture for the concurrency application system functionality. As mentioned above, at the client layer there is a client library (concurrency application plug-in enabler) 300 that resides in the mobile device 10 that can activate an application while others are already active on the mobile device 10 and can switch an active application between the foreground and background, either in response to a user control or automatically.

At an intermediate abstraction layer there is a SS7/IN interface function 220 and a client interface function 230. The SS7/IN interface function 220 detects call context information from a mobile device call. Call context parameter information includes, but is not limited to, information such as the mobile device ID, telephone number of the mobile device, the number called by the mobile device, etc., obtained from the MSC and location of the mobile device or other information obtained from or via the GGSN/PDSN/WirelessRouter 85. In addition, the client interface function 230 receives any special data from the mobile device 10 and delivers concurrency application information or content to the mobile device 10 in the appropriate format depending on the capabilities of the mobile device. There is also a concurrent behavior logic function 240 that maintains a profile data file for each mobile device 10 as to the types of concurrent applications to be provided to a mobile device and parameters associated with the concurrent application, which applications are active or available on a particular mobile device, etc. Next, there are a context triggers function 250 and a smart content agents function 260. The context trigger function 250 determines what type of concurrent applications should be invoked for a mobile device based on the context of the current activity of the mobile device (type of call made, time of day of the call, location of the mobile device when a call is made, calling number of the call, duration of the call in progress, etc.). Other context triggers may be location based, such as the absolute location of a mobile device user as well as the proximity of one mobile device user to another mobile device user. The location information can be absolute GPS-based or relative RFID-based, technologies for which are known in the art and used or will be used in mobile communication networks and services. The smart content agents function 260 activates one or more concurrent applications to retrieve certain content relevant to the context of a mobile device call, under control of the context trigger function 250. The CAS fetches the content from various sources in the internet that is of relevance to the presentation trigger. The different content information downloaded from the internet can be classified into the following broad segments or types.

1. Content information that is of relevance to the mobile device user. For example, this could be simplistic information like the number of email messages pending for the mobile device user, number of unread messages in the various message boards that the mobile device user participates in, or the release of new media content (full track music, ringback tones, ring tones, etc) that is of relevance to the mobile device user.
2. Content information that is of relevance to the mobile device user and a concerned remote party. The remote party may be a caller, a called party if the presentation was triggered by a phone call, or the sender/recipient of a message (text or multimedia message). For example, this could be, in addition to the content described in the previous item, information from public information sharing sites such as Yahoo Answers, Wikipedia etc., on topics that are of mutual interest to the mobile device user and the remote party.

3. Content information that is of relevance to the mobile device user in the context of his/her social networks/communities. This information is relevant to all the social networks that the mobile device user may be participating in at the same time.

The appropriate one or more CAS applications (CAS App-1 to CAS App-n) 210(1) to 210(N) are called upon by the context trigger and smart content agents functions 250 and 260. In addition, there is a plug-in application abstraction function 270 that interfaces the concurrent behavior logic function 240 with one or more concurrency application plug-ins 215(1) to 215(M).

Figure 5:
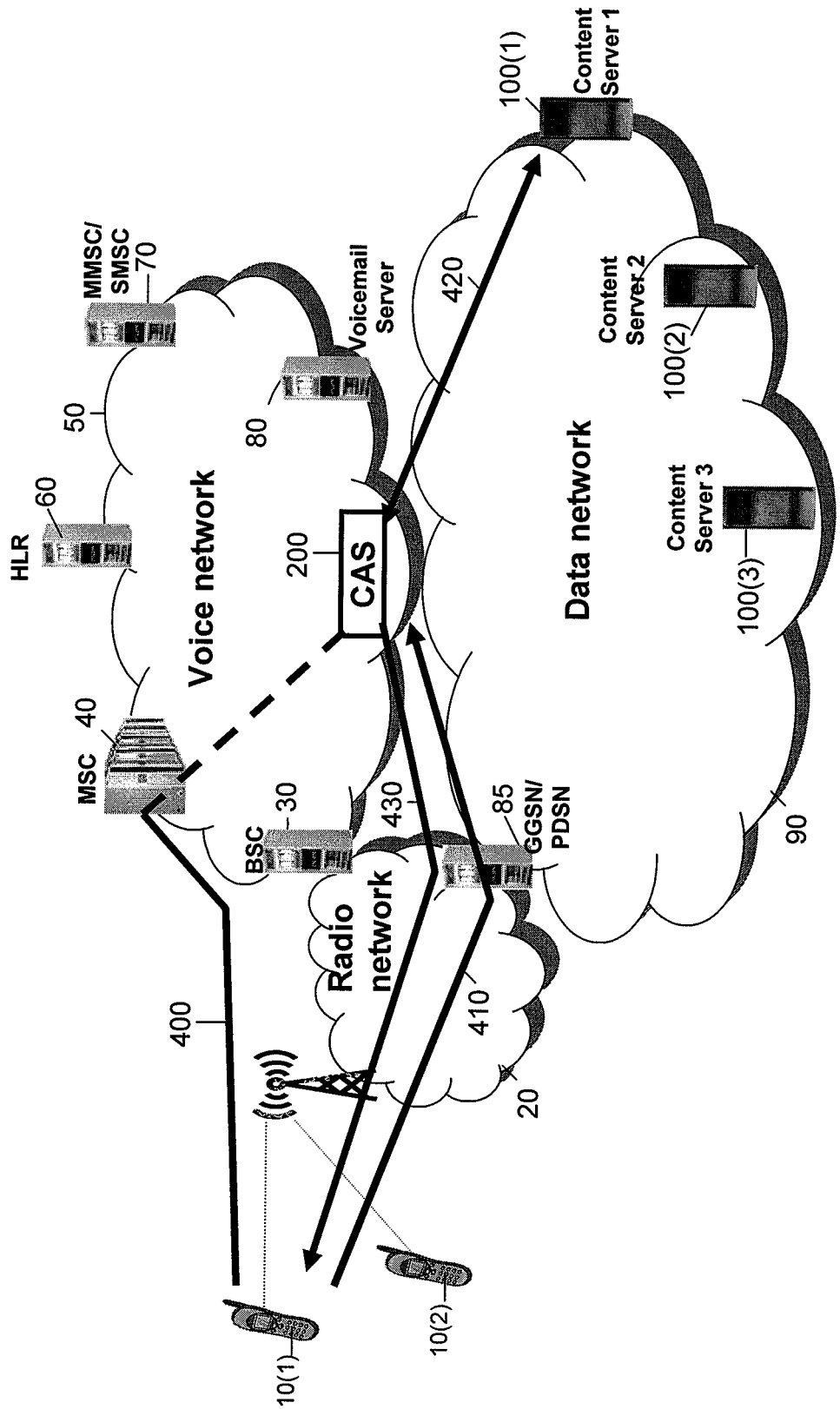
FIG. 5 is a diagram illustrating data flow for a context-based media content delivery method according to an embodiment of the present invention.

FIG. 5 illustrates data flow for a call context based content delivery application according to one embodiment of the invention. As indicated at 400, the mobile device user places a call that is processed by the MSC and the CAS 200 obtains call context information for the call from the MSC (e.g., called number, calling number, time of day of call, etc.). For example, one trigger may be mobile device user initiated whereby a mobile device user manually commands the client plug-in on his/her mobile device to contact the CAS 200 in order to fetch certain content. Another trigger may be a social community event reflecting some change or information distribution event in the social community such as new content uploaded to a social community website, changes in membership of the social community, social events such as meetings, birthdays, parties, etc. One example of a social community is described hereinafter in connection with the description of FIG. 6. These call context information triggers are obtained via the IN interface or similar interfaces as may be defined to obtain call content information in the operator's network of the CAS 200. If location is to be a context trigger as well, the location of the mobile device at the time the call is made is obtained at 410 via the interface of the CAS to the data network via the GGSN/PDSN/WirelessRouter 85. The CAS 200 uses the call context triggers to retrieve content from various content servers (in the data network) at 420. At 430, the CAS then delivers the retrieved content to the mobile device that made the call, or to another mobile device (the destination of the call or some other mobile device) via either the MSC and through the radio network or via the GGSN/PDSN/WirelessRouter 85 and through the radio network. The data flow diagram shown in FIG. 5 is applicable to any call context where content may be delivered to the mobile device user based on the context of the call. The call context may be used to automatically retrieve useful content (via the WWW for example) and push it to the mobile device user. In the case where the content pushed to the user involves a WWW site of an advertiser or other third party, the CAS 200 also allows the user to browse the site while engaged in the voice call.

It should be understood that the context-based content delivery methods according to embodiments of the present invention are generally applicable to any type of communication session context, not just voice calls. Thus, the term "communication session" is introduced to refer to any type of communication activity that a mobile communication device is capable of. As such, context parameters associated with a communication session of a mobile communication device may further include, but are not limited to, type of mobile gaming application being engaged in or played by mobile communication device user, type of media (audio or video) being streamed to the mobile communication device, type of web site being browsed by the mobile communication device, etc.

Moreover, the content that is delivered to a mobile communication device based on the context parameters of the communication session may include, but is not limited to: text, video, audio, gaming functions, web site content (such as from one or more advertisers), web site links that can be selected by a mobile communication device user, etc. Thus, the term "content" as used herein may include text, video, audio, digital images, website links, website content, electronic coupons, etc.

Figure 6:
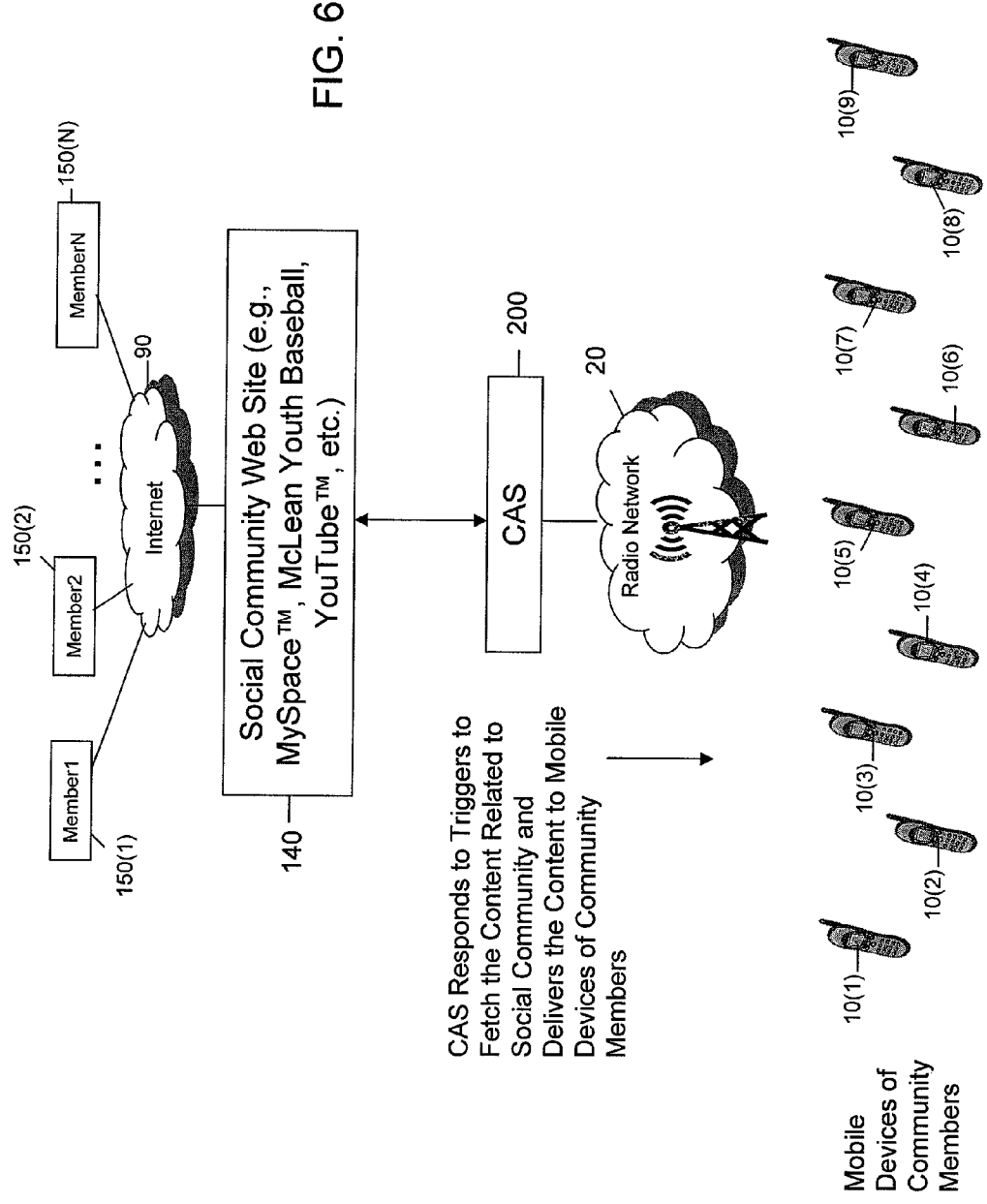
FIG. 6 is a block diagram illustrating use of the concurrency application server in delivering to mobile devices content related to a social community according to an embodiment of the invention.

Turning to FIG. 6, according to one example, the mobile content delivery system allows users or members of a social community to also interact with each other with their mobile devices. That is, members of the social community are assumed to have a mobile communication device that is capable of interacting with the CAS as described above. A social community, as that term is used herein, is a group of individuals that share a common interest of any type. Examples of social communities are local community organizations such as little league baseball organization (e.g., McLean Youth Baseball) that has its own web site to disseminate information to participants (members) and potential participants, as well as social communities that has developed because of the Internet such as MySpace™ (www.myspace.com), YouTube (www.youtube.com), and others. This latter type of on-line social community has developed as a result of users learning to use the World Wide Web to create, maintain grow social networks and has become very popular recently. A number of social networking/community sites allow people to create and maintain their social interactions with others and be introduced to other members of the site who have similar interests/tastes to each other. Members of these web sites can also upload a wide variety of content, such as text, photos, videos, audio, etc. The terms social community, user community and social circle are used interchangeably herein.

As shown in FIG. 6, the CAS connects with a social community web site shown at typically via the Internet 90. Individuals become members or users of the social community web site when they establish account identifiers (user names and passwords) with the web site. Members of the social community web use their account identifiers to sign in to the website and receive a wide variety of information from other members. When establishing their accounts with the web site, users can also indicate their mobile device telephone number and indicate that they can accept communications related to the web site at their mobile devices. The members may not even be aware of the existence of the CAS since the content delivery mechanism can appear completely transparent to the mobile device users. In addition, mobile device users can interact with the social community web site via their mobile phones by browsing pages of the web site, updating information, uploading information, sending messages to other members, etc. In FIG. 6, members1-membersN are identified by reference numerals 150(1) to 150(N). The mobile devices of community members are shown at reference numerals 10(1) to 10(N).

The CAS 200 delivers content to members' mobile devices based on triggering criteria. The trigger criteria may be user initiated, i.e. a mobile device user manually triggers the CAS 200 to fetch information for delivery to it and/or other mobile device users (a mobile device of another member). The CAS 200 may retrieve and forward data in response to call and messaging related triggers, events associated with a social community web site such as new content uploaded to the social community web site, membership changes to the social community, social event changes (birthdays, parties, meetings), etc. The content that is delivered to the mobile devices may be content relevant to a particular member, content from other members involved in the triggering criteria, or content involving all members in the social community.

Figure 7:
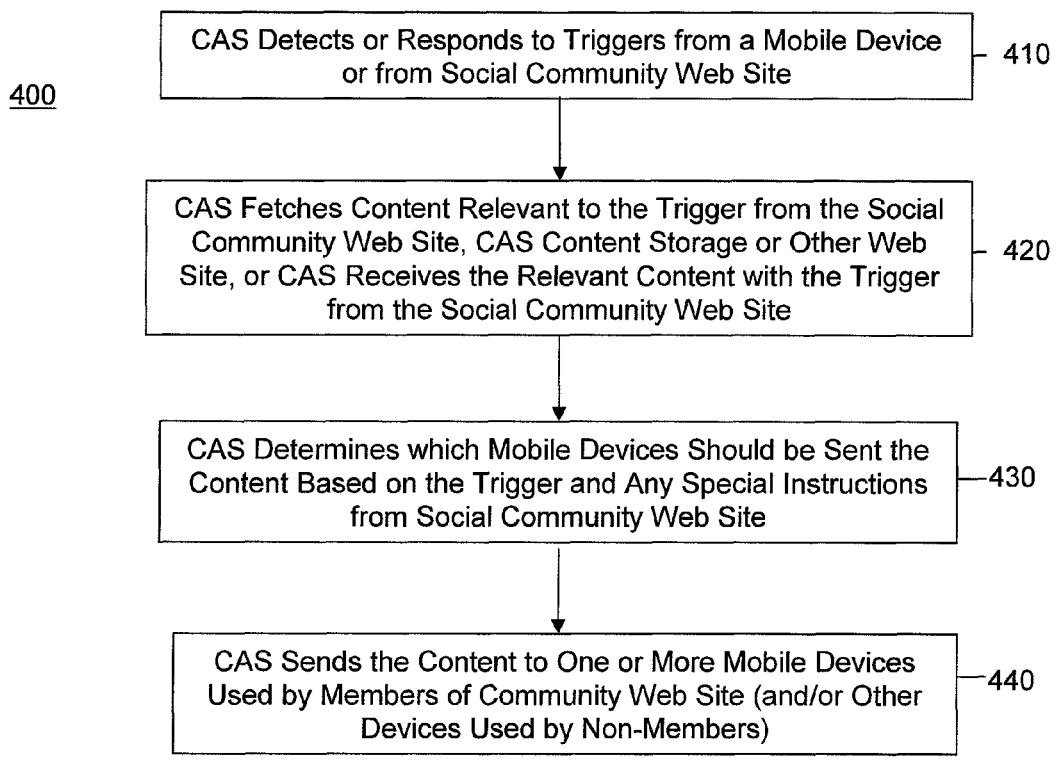
FIG. 7 is a flow chart illustrating delivery of social community related content to mobile devices according to an embodiment of the invention.

FIG. 7 illustrates the flow of the mobile social community content delivery method 400 according to one embodiment. At 410, the CAS detects or responds to a trigger from a mobile device or from a social community web site. A member may initiate a triggering function from his/her mobile device or from a PC connection to the social community web site that necessitates content delivery to other members' mobile devices. At 420, the CAS 200 fetches the content (depending on the trigger) from the social community web site, from data storage at the CAS (assuming the CAS already has locally stored the relevant content), or from another web site(s) that stores the data relevant to the trigger. When the trigger occurs at a social community web site, the social community web site may send the relevant content to the CAS 200. At 430, the CAS 200 is informed from the trigger or from a special instruction from the social community web site as to the mobile devices (by way of mobile device identifiers—telephone numbers) to which the content should be delivered. At 440, the CAS 200 sends the content to the mobile devices.

Example scenarios are described below.

Content Presentation at the End of a Voice Call or Message Trigger

Trigger: Mobile device user just finished/terminated a voice call or has just received/sent a message to another mobile device user.

1. Content relevant to just the mobile device user could be the following information.
   a. Unread email messages pending for the mobile device user to act upon across all the mail accounts (yahoo.com, gmail.com, etc.) the mobile device user may have.
   b. Relevant information from the public on-line message boards and peer answer groups that are of interest to the user. This could be for example, the number of new questions on a topic in the Yahoo Answers message board for which the mobile device user is an expert or the number of answers received by the mobile device user for questions s/he may have posted on the message boards.
   c. New digital media content (music, videos, podcasts, movies, etc.) of interest to the user. New or updated information that is available to the mobile device user from the various digital media content portals like iTunes, Yahoo Music etc.
   d. Information about the other party on a voice call or at the other end of a message exchange with the mobile communication device user. This could be the public known profiles and interests the remote party may have published about himself/herself, taken from one or more websites to which the remote party has uploaded such information about himself/herself.
2. Content relevant to both the participants in the triggering activity (phone call, message, etc.).
   a. Number of topics of mutual interest to both the parties on the various message boards the two parties may individually participate in. The CAS would sort through such information to determine the common interests. This could for instance include information regarding the topics/questions posted by one of the parties and answered by the other.
   b. Digital Media content available on the digital media portals that are of interest to both the parties in the call. Again, the CAS would analyze the information to determine the content that matches common interests of the parties.
   c. Social networks that the two parties may be interested in becoming a part of based on the learned or expressed interests of the two parties.
3. Content relevant to the social communities the two parties belong to.
   a. Social community related content information including upcoming events and messages that are of relevance in the social communities in which the two parties participate. Again, the CAS would fetch this content from the source web sites associated with the social communities.

Adding a New Member/Creating a New Social Community

Trigger: End of voice call or messaging activity or social network event.

Upon being invoked by the appropriate trigger the client on the mobile device member launches to connect the mobile user to the appropriate social networks of interest to the user. While viewing the list of the social communities, the mobile device member/user can select the phone number of the remote party in the voice call or another mobile device user who is a non-member into one of the social communities to invite that mobile device user to become a member of that social community. Alternatively, the mobile device member/user may create a new social community with the remote party in the voice call or another mobile device user. Any changes to in the social community triggers presentation to all members of the community of content that provides basic information on the change, e.g., a new member.

Social Community Events

Trigger: Community event information added or changed.

Upon an event in the social community, members' mobile devices are sent content relevant to the event. The event may be availability of new information related to the social community. For example, when a new media content (digital photograph, audio, video) is uploaded by a member in the community, a trigger is sent by the social community web site to the CAS to send to the mobile devices of all the other members in the community www link to a web site page that allows the members to view or listen to the media content that was just uploaded from the mobile devices (or from a PC). Similarly, when a new member joins the social community or a current member resigns from the social community, a trigger may be sent by the social community web site to the CAS to transmit a notice to the mobile devices of the members notifying them of the membership change. Another example of a social community event is when a member plans an event such as a party, meeting, etc. In this case, the social community web site sends a trigger to the CAS, together with data concerning the planned event, for transmission to the mobile devices of the other members. Alternatively, the transmitted content may comprise a www link to a web site page that a mobile device user can select to be presented with the details of the planned event. Thus, in this scenario, the trigger is the additions or changes made to social community event information, or the details about an event planned by a member of the social community and a member has uploaded details about the event to the social community web site.

New Appointment/Event in the Social Community

Trigger: Community event (e.g., a new party is being planned and details have been uploaded by a member).

When a member plans an event, such as a party, meeting, etc., the social community web site sends a trigger to the CAS, together with data concerning the planned event, for transmission to the mobile devices of the other members. Alternatively, the transmitted content may comprise a WWW link to a web site page that a mobile device user can select to be presented with the details of the party.

Social Community Messages

Trigger: New message from one of the members in the social community. A message from one of the members in the social community is supplied to the CAS by the social community web site and the CAS sends the message to the mobile devices of all the members of the community to indicate some activity in the community.

Figure 8:
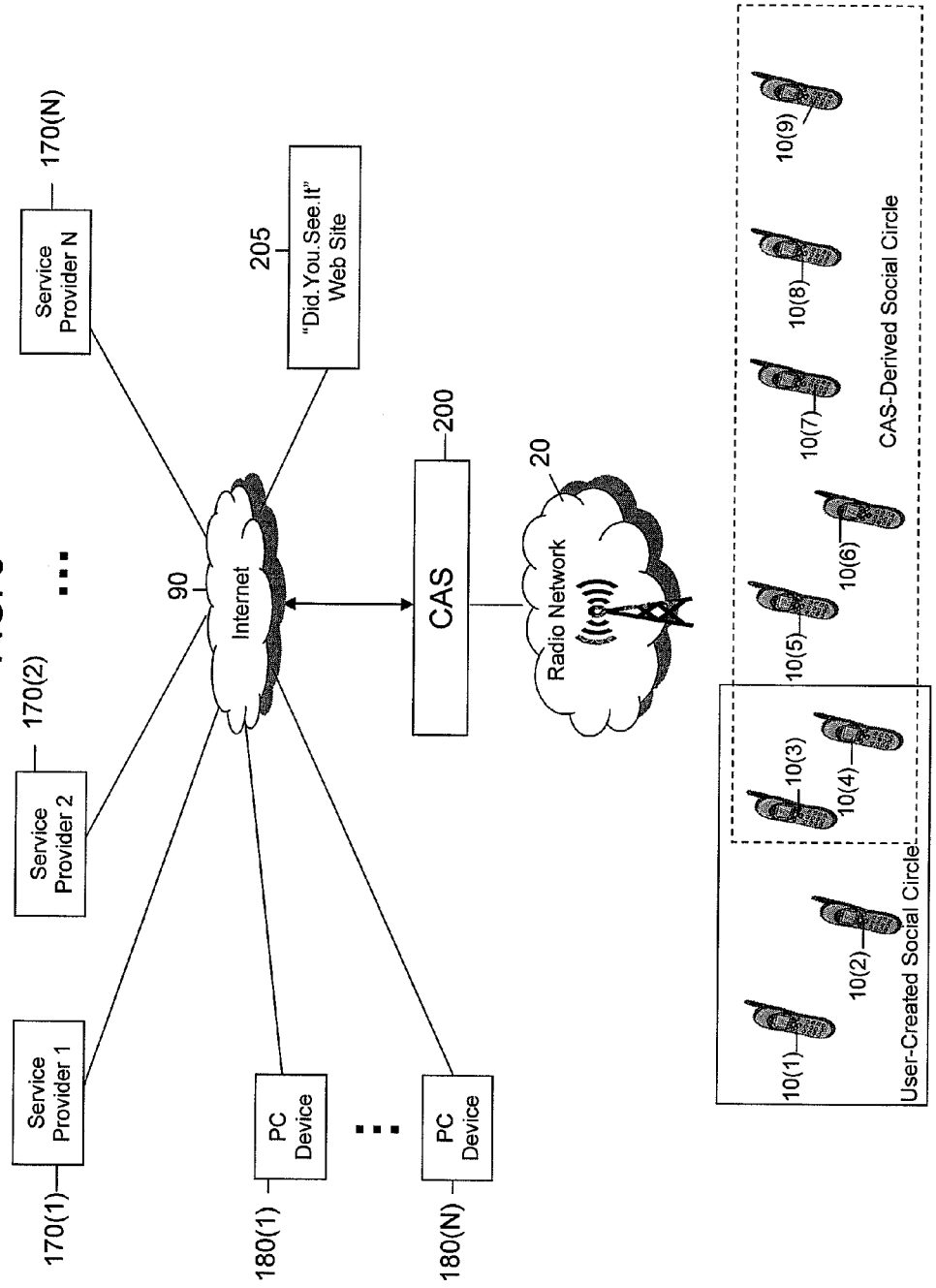
FIG. 8 is a block diagram illustrating how the concurrency application server coordinates actions of users with service providers and user communities according to an embodiment of the invention.

Turning to FIG. 8, another example of how the CAS 200 may deliver information and notifications from multiple services to a community of mobile device users. The CAS 200 will form a relationship with multiple service providers shown at reference numerals 170(1) through 170(N) and offer these services to the mobile device users. Examples of service providers are the iTunes™ media porthole, Yahoo Music, Online music stores such as Amazon.com, etc. In this sense, the CAS 200 serves as a central portal through which mobile device users can make purchases for goods and/or services across multiple vendors, shown as service providers 170(1) 170(N). Accordingly, the CAS 200 enables mobile device users to subscribe to multiple services as well as to receive relevant alerts from their "social circle" of friends. These so-called "social circles" may be created by explicit user designations or configurations as well as implicitly learned by the CAS 200 through knowledge of activities of the users. The former type of "social circle" is referred to as a user-created social circle and the latter type referred to as a CAS-derived social circle. FIG. 8 illustrates, as an example, a user-created social circle comprises mobile device users 10(1) to 10(5) and a CAS-derived social circle comprises mobile device users 10(3) through 10(9). The social circles may or may not have overlap.

The CAS 200 delivers notifications/alerts to users thru multiple delivery channels. One of the delivery channels is via the client plug-in on a user's mobile communication device. Alternatively, a notification/alert may be delivered to a user's email account that a user accesses via a PC device, several of which are shown at 180(1) to 180(N) shown in FIG. 8.

FIG. 8 also illustrates a web site 205 that may be maintained by the same entity that maintains the CAS 200. The web site 205 is labeled "Did.You.See.It". Relationships are established between the web site 205 and the various service providers 170(1)-170(N) such that the web site 205 can track when a user flags an item of interest on a web site of one of the service providers while the user is browsing web sites from a personal computer. The service providers may be web-based vendors of goods or services, for example. The functions of the web site 205 are explained in further detail hereinafter in conjunction with FIG. 10.

A variety of actions are possible with each notification/alert. These actions are not necessarily related to one of the service providers 170(1) to 170(N). For example, when a user gives a positive rating to a particular media asset (e.g., song) on one the website of a particular service provider, he/she may have an opportunity to buy a full track download of the song on his/her mobile device using a completely different service provider through the CAS 200. The CAS 200 coordinates these services to present a cohesive view to the mobile device user.

The following are specific, but not limiting, examples.

EXAMPLE 1

User A purchases some media content M on his/her mobile device. Moreover, User A is a member of one or more social circles either user created or CAS-derived. The CAS 200 can send an alert to all of the members in one of user A's social circles indicating that user A has acquired the rights to the media content M. The CAS may optionally apply filtering criteria to select a subset of the social circle based on the personal preferences of the members of the social circle. The social circle members can be provided an opportunity to do any number of activities based on the alert received. Examples of such activities are:

1. Purchase, via the CAS, the same media content M from the same service provider that user A made the purchase or from any other service provider that the CAS may have an established relationship.
2. Purchase related media content M1 that is related in some way to the media content M. For example, if the media content M is a ringtone:
   a. The CAS may find the corresponding full song to enable the user to download the full track music corresponding to media content M from a service provider with which the CAS has a relationship.
   b. The CAS may find the corresponding album art for media content M and enable the user to download it from a service provider.
   c. Provide an ability to buy any other media content associated with the same album or artist associated with the media content M.
3. Send a request to user A to enable another user to preview the media content M on their own PC device or mobile device. The CAS 200 brokers the transaction and provide a digital rights management (DRM) free version of the sample to the other users in the community.
4. Enable users in the social circle to request association of the media content M with the users persona on user A's mobile web-space. For example, if the content M is a ringtone, the media content M is rendered on user A's device every time the current user (e.g., user B) communicates with user A either via a voice call or text message. As another example, if the media content M is a ringback tone, then the ringback tone is played back to the particular user (e.g., user C) whenever user C makes an outgoing voice call to user A.

EXAMPLE 2

User A uses his/her PC or mobile device to rate/review a particular song. The rating could be made on a mobile portal or on a PC-based portal such as iTunes™, with which the CAS has a relationship. The CAS sends a notification or alert to the members of the social circle of which user A is a member to advise those users about user A's recent rating. A user in that social circle who is buying a new ringback tone for user A may use this alert/knowledge to assist him/her in purchasing the appropriate media content. Alternatively, a user in that social circle who is interesting in buying a gift for user A may choose content based on this notification information. Thus, the CAS provides a link between user's rating of media content (from the user's phone or PC) to alert members of that user's social circle.

Figure 9:
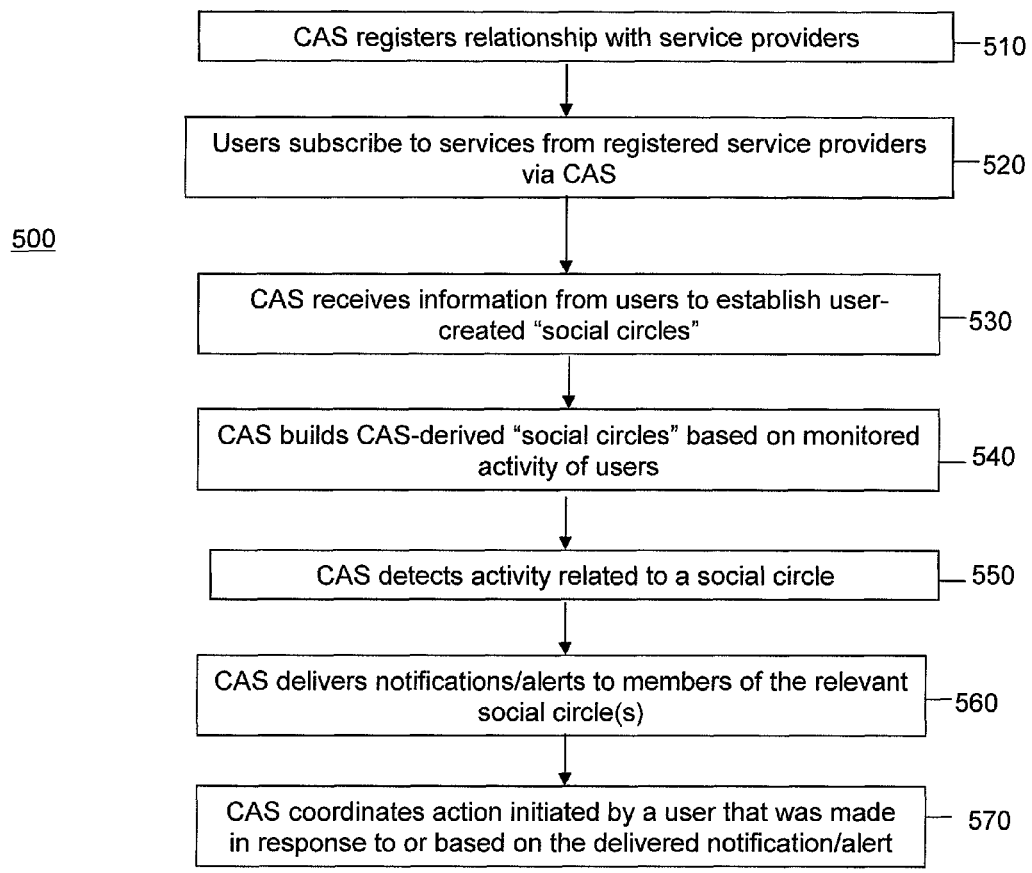

Turning to FIG. 9, a flow chart is now described for a process 500 that may be implemented to perform the functions described in connection with FIG. 8. At 510, the CAS 200 registers relationships with service providers. This is a continuous effort that is performed each time the CAS 200 establishes a relationship with a new service provider. At 520, the CAS 200 processes subscriptions of mobile device users to services from one or more of the service providers. The CAS 200 manages user account and related information so that when the CAS 200 makes a purchase from a service provider on behalf of a user, the CAS 200 supplies appropriate user account information to the service provider who collects payment from the user. At 530, the CAS 200 receives information from users to establish user-created social circles. For example, a user could manually create a group of people who have a common interest in a band or artist. In this example, the social messaging and interactions between these users is the essence of this artist or band related social circle. At 540, the CAS builds CAS-derived social circles by monitoring activities of users. For example, a dynamic social circle may be created from the group of people you call or get calls from often. This group could be named "my top phone friends" as an example. Similarly, a user may create a list of his/her "favorite" people to send messages as another type of social circle.

At 550, the CAS 200 detects an action taken by a user that is related to that user's membership in a social circle. Examples of these actions are described above. At 560, the CAS 200 delivers a notification/alert to all (or a subset of) members of that user's social circle depending on the nature of the triggering user action. At 570, the CAS coordinates the actions made by a user in response to the delivered notification or alert, such as facilitating the user's purchase of media content. For example, a mobile device user that receives a notification or alert may send a request to the CAS 200 to receive additional information related to the alert and/or to purchase a particular digital media content or other product or service.

Thus, the process shown in FIG. 9 may be summarized as storing data representing a relationship with an entity that is a vendor of goods or services; storing data indicating association of a plurality of mobile communication device users in a user community; detecting an action by a mobile communication device user with said entity, wherein said action is related to the user community; and sending a notification to mobile communication device users that are members of the user community based on said action.

Reference is now to FIG. 10, in conjunction with FIG. 8, for an explanation of yet another example of how a mobile device user may share content related data with other mobile device user's in his/her social circle, etc. In the process 600 of FIG. 7, at 610, a relationship is established between the "Did.You.See.It" web site 205 and one or more of the service providers 180(1)-180(N). At 620, a mobile user can establish an account on the web site 205 and the CAS 200 makes an association between the user's mobile account and the user's account on the web site 205. At 630, the user, using a personal computer, browses web sites of various service providers and selects (tags) certain media or other content to be added to a list maintained in association with an identifier of the user, e.g., the user's account on the web site 205. For example, the user may see a video on YouTube, a song on iTunes, a book on Amazon.com, etc., and want to have that item selected (tagged) so that the user can later share his/her interest in that item with the user's mobile social circle of friends. The item that is flagged could be a product or service of interest to the user that is being marketed by a service provider. At 630, the user may browse web sites of various service provides from the user's mobile device, rather than from a personal computer. At 640, the item flagged by the user is added to the user's account on the web site 205. At 650, the CAS 200 communicates with the web site 205 or otherwise synchronizes its databases with the web site 205 to capture and update the user's list of tagged items and generates a version of that list that is suitable for the user's mobile device. At 660, the CAS 200 transmits the list of items to the user's mobile device. At 670, the mobile device user can send a notification to the mobile devices for members of a social circle of which the user is a member, thereby sharing the list of items with his/her social circle, etc., using the techniques described above in connection with FIG. 9. At 670, the CAS 200 may send notifications (user community broadcast) to the mobile devices of users who are part of that user community, rather than the mobile device user sending those notifications.

In a variation to the configuration described above in connection with FIG. 10, the user may have installed on his/her personal computer software that logs pointers or tags to certain media content selected or identified by the user when browsing certain web sites of service providers. The software on the user's personal computer will upload to the CAS 200 information associated with media content selected by a user during a user's browsing session. An upload may occur after the user closes out a browsing session on one of a service provider's website. The CAS 200 will then transmit a mobile version of a list of those media content items to the user's mobile device, allowing for display on the user's mobile device as well as sharing with his/her social circle, etc., as described above.

The process shown in FIG. 10 may be summarized as storing data associated with a user's selection of an item of interest while the user views information at a web site of a vendor of goods or services, wherein said storing comprises storing the data in association with an identifier for said user; and sending a notification to mobile communication device users that are members of a user community to which said user is a member, wherein said notification contains information concerning the item of interest selected by the user.

Song Trivia Related Mobile User Communities

To keep a user's attention focused on a product, such as music, collecting and providing trivia related to a song may be a useful. The interest that a user holds for a song and the related information may be relatively short-lived. Users tend to get tired of a song and a subscription very easily. However, users appreciate interesting information about a song or other media content. To encourage users to return to a particular service, e.g., a music download service, song trivia may be used on a periodic or occasional basis to maintain a user's interests in returning to the service. It should be understood that trivia is not related to song trivia. For example, movies and videos may also have associated trivia that may be useful as a marketing technique in much the same way as song related trivia.

The CAS 200 may assemble trivia for a song and present it to mobile communication device users in different contexts. The CAS 200 will serve as a platform for users to read trivia and add trivia.

Song-related trivia may comprise names of the artists, name(s) of the lyricist, the specialty and finer aspects of the composition, the composer, the writer's underlying intended theme of the song, the circumstances under which the song was written and recorded, any other interesting information There are various sources from which trivia can be collected, including, but not limited to:

Musicians, critics, and music researchers—for trivia about the finer aspects of the composition.

Composers, lyricists, and singers—for trivia specific to the composition and any other interesting information surrounding the composition.

Content editors—for trivia from user blogs.

Mobile communication device users—for user generated trivia that users can add to the database of trivia maintained by the CAS 200.

A content editor may be involved in editing the trivia received from mobile communication device users to ensure the authenticity of the information.

The CAS 200 maintains a record of user-added trivia and can present this information in several ways. For example, if a user belongs to a mobile music social community, the CAS 200 may transmit the user-added trivia to every member of that social community as a "community-wise broadcast" feature. The members in the community are informed that User-A belonging to the same community has added a trivia for a Song-S. The content presented will also have an option for other community member mobile device users to add a trivia for a song and/or to purchase and download the song.

The CAS 200 may implement a "track-a-trivia" feature. This feature will works together with the "community-wise broadcast" feature. The CAS 200 may store an indication or tag of mobile device users who respond to the broadcasted trivia. For example, the CAS 200 may tag these users as "curious users" and form a "trivia group" from the "curious users". This technique may be useful in tracking when the broadcasted notification is sent to mobile device users that are not part of a user community, but for which the CAS 200 desires to draw new users into that user community. In this way, the CAS 200 will receive responses from mobile device users that are not part of the user community and store an identifier of those mobile device users not part of the community that responded to the notification in order to form group of "curious users."

The CAS 200 may implement an "ask-for-trivia" feature. When there are new songs added into the song database that the CAS 200 accesses, if the CAS 200 needs trivia for new songs, the CAS 200 sends alerts to all the members in the "trivia group" asking the users to send trivia for one or more new songs in the database. Users can choose to respond to these alerts with a trivia.

Song Search Cookie

Content discovery by searching is a fairly common occurrence. The CAS 200 may use a "cookie" that stores search criteria that a user enters through the browser application on his/her mobile communication device. The CAS 200 stores the cookie. Over a period of time, the CAS 200 accumulates the different search strings that a user has entered. Whenever there is an update to the database of media content accessible by the CAS 200, the CAS 200 can run the search criteria onto the updated database and if there are any matching songs, those can be pushed to the mobile device user associated with the search criteria by, for example, a port directed SMS message.

A mobile device user can register for a function of the CAS 200 whereby the CAS automatically sends to the mobile device user songs that are within a particular genre whenever that there is an update to the database in that genre. That is, when there is an update to the database of media content associated with a specific genre, the CAS 200 can intelligently "push" the new media content for that genre to (only) those subscribers who have searched for this genre. This technique increases the likelihood of sales to mobile device users when compared to pushing an alert about the database update to all mobile device users. This in turn reduces marketing costs because an alert can be sent to fewer users, but in a more targeted fashion.

When the CAS 200 identifies that a set of subscribers are repeatedly searching for the same set of songs, the CAS 200 may transmit a message recommending to the users a particular search criteria. The CAS 200 may send a message to certain mobile device users presenting a list of songs that are displayed as "Your Search Based Songs".

User Communities Based on Search Criteria

The CAS 200 may store data for user communities based on users' search criteria for media content, such as songs. As a result, the CAS 200 can form a network of users who search for songs within a genre/sub-genre.

The CAS 200 maintains the history of search criteria that a user enters. The CAS 200 groups users searching for songs within a genre into a community. The CAS 200 may group users further based on what the search criteria is and based on the actions performed by the users. For example, if a user acts to purchase a song, the CAS 200 may include the user into a sub-genre-specific community.

If the CAS 200 returns no results for a user's search criteria, the CAS 200 may present a page to the mobile device user where the user can indicate his/her preference to receive an RSS feed for that search criteria. The CAS 200 maintains the list of users who are interested in RSS feeds and sends the songs that satisfy the search criteria when the songs become available.

Community Bulletin

The CAS 200 has access to the set of all parties that call, text or email to a specific mobile device user subscriber (either from NEF logs or from last-10 callers history). Assuming that the parties that call, text or email a mobile device user are also subscribed mobile device users, the CAS 200 can examine this data in order to match the preferences of the calling parties with the preferences of the subscriber. For example, the search criteria (that defines a mobile device user's interests) may be used to match the preferences of the two mobile device users. If the search criteria does not match, the CAS 200 can send information on songs and other interests of each of two mobile device users.

Mobile device users may configure their service with the CAS 200 such that with every media content purchase made by the user, the CAS 200 broadcasts a notification to every mobile device user in that user's community. The mobile device user that made the purchase can also choose to add a comment specific to the media content, and the CAS 200 will include the comment along with the media asset purchase notification to the members of the community.

Mobile device users may also choose to have a specific graphical presentation or "skin" when communications are made by the CAS to users within a particular community. If a user is part of more than one user community, the CAS 200 may allow a user to customize the skin used for each user community. Then, when a notification is sent to mobile communication devices for members of a particular user community, the notification may comprise a graphical presentation that is unique to the particular user community. This user community specific graphical presentation concept may be used in connection with any one of the processes described herein.

The CAS 200 may receive requests from a mobile device user to select a particular user community and allow the user to view all the updates in that particular community. For example, if the user has received broadcast messages from other users and recommendations from other users, the user view is able to view the messages that originate within a specific community.

The device and methods described herein may be embodied in other specific forms without departing from the spirit or essential characteristics thereof. The foregoing embodiments are therefore to be considered in all respects illustrative and not meant to be limiting.

What is claimed is:

1. A method for delivering content to a mobile communication device, comprising:
   a. detecting a communication session involving a mobile communication device user;
   b. determining one or more context parameters associated with the communication session;
   c. retrieving content from one or more web sites that the mobile communication device user or another party involved in the communication session possibly has an interest; and
   d. delivering the content related to the context parameters to one or more mobile communication devices;
   wherein the communication session is a voice call between the mobile communication device user and another party or a messaging session involving the mobile communication device user,
   wherein (b) detecting comprises detecting that the mobile communication device user just terminated the voice call or the mobile communication device user completed sending or receiving a message, and
   wherein (c) retrieving comprising retrieving content comprises retrieving unread email messages for the mobile communication device user to act upon across all email accounts the mobile communication device user may have.

2. The method of claim 1, wherein (d) delivering comprises sending said content to the one or more mobile communication devices that are used by the members of a user community.

3. The method of claim 2, wherein (d) delivering comprises delivering content related to an event in a user community to one or more mobile communication devices used by members of the user community.

4. The method of claim 2, wherein (d) delivering comprises delivering content related to a message to one or more mobile communication devices used by members of the user community.

5. The method of claim 2, wherein (d) delivering comprises delivering content or a link to content informing members of the user community about membership changes in the user community.

6. A method for delivering content to a mobile communication device, comprising:
   a. detecting a communication session involving a mobile communication device user;
   b. determining one or more communication context parameters associated with the communication session;
   c. retrieving content from one or more web sites that the mobile communication device user or another party involved in the communication session possibly has an interest; and
   d. delivering the content related to the context parameters to one or more mobile communication devices;
   wherein the communication session is a voice call between the mobile communication device user and another party or a messaging session involving the mobile communication device user,
   wherein (b) detecting comprises detecting that the mobile communication device user just terminated the voice call or the mobile communication device user completed sending or receiving a message, and
   wherein (c) retrieving comprising;
   based on the determined communication context parameters, automatically generating a content trigger configured to start one or more concurrency applications corresponding to the plurality of mobile communication devices; and
   retrieving information from one or more on-line user communities that are of interest to the mobile communication device user using the one or more concurrency applications.

7. The method of claim 1, wherein retrieving further comprises retrieving newly available digital media content from one or more digital media content portal web sites.

8. The method of claim 1, wherein retrieving further comprises retrieving information about another party that is on the voice call or at the other end of a message exchange with the mobile communication device user.

9. The method of claim 1, wherein retrieving further comprises retrieving information from one or more web sites to which the other party has uploaded information including his/her interests.

10. The method of claim 1, wherein retrieving further comprises retrieving information or content that is determined to be of mutual interest to both the mobile communication device user and the other party with whom the mobile communication device user is on a voice call or at the other end of a message exchange with the mobile communication device user.

11. The method of claim 1, wherein retrieving further comprises retrieving content from a user community web site of which both the mobile communication device user and the other party on the voice call or at the other end of a message exchange are members.

12. A method of sharing information among a plurality of mobile communication device users, comprising:
   a. storing data associated with a user's selection of an item of interest while the user views information at a web site of a vendor of goods or services, wherein said storing comprises storing the data in association with an identifier for said user;
   b. sending a notification to mobile communication device users that are members of a user community to which said user is a member, wherein said notification contains information concerning the item of interest selected by the user; and
   c. retrieving content from one or more web sites contains information concerning the item of interest selected by the user,
   wherein (c) retrieving comprising;
   based on the user's communication context parameters, automatically generating a content trigger configured to start one or more concurrency applications corresponding to the plurality of mobile communication devices; and
   retrieving information from the user community that are of interest to the mobile communication device users using the one or more concurrency applications.

13. The method of claim 12, and further comprising associating the identifier for said user with the user's mobile communication services account.

14. The method of claim 13, and further comprising transmitting the data to the user's mobile communication device corresponding to the user's mobile communication services account.

15. The method of claim 12, and further comprising storing data comprising identifiers of mobile communication device users that are part of said user community, and retrieving identifiers of mobile communication device users for whom the notification is to be sent.

16. The method of claim 6, wherein (d) delivering comprises sending said content to the one or more mobile communication devices that are used by the members of a user community.

17. The method of claim 16, wherein (d) delivering comprises delivering content related to an event in a user community to one or more mobile communication devices used by members of the user community.

18. The method of claim 16, wherein (d) delivering comprises delivering content related to a message to one or more mobile communication devices used by members of the user community.

19. The method of claim 16, wherein (d) delivering comprises delivering content or a link to content informing members of the user community about membership changes in the user community.

* * * * *